Patented May 9, 1933

1,908,225

UNITED STATES PATENT OFFICE

JAMES N. CURRIE AND ALEXANDER FINLAY, OF BROOKLYN, NEW YORK, ASSIGNORS TO CHARLES PFIZER & COMPANY, OF BROOKLYN, NEW YORK, A CORPORATION OF NEW JERSEY

PROCESS OF FERMENTATION

No Drawing.   Application filed February 5, 1931.   Serial No. 513,773.

It is a well known fact that many bacteria grow vigorously only on the surface of a liquid medium. Such bacteria are commonly known as surface growing and generally form a mass of cells that floats on the surface as a film or pellicle. As an example of the surface growing or film forming bacteria, we would cite the group known as acetobacter. By acetobacter group we mean bacteria of the genus Acetobacter and of which Acetobacter pasteurianus is the type species (Bergey's Manual of Determinative Bacteriology, page 39). Some members of this group, and their minimum, optimum and maximum growing temperatures are given in Henneberg's "Gaerungsbakteriologisches Praktikum, Betriebsuntersuchungen und Pilzkunde" (Verlag von Paul Parey in Berlin, 1909) the lowest minimum being 8° C. (p. 517, line 9), and the highest maximum being 42° C. (p. 520, line 12). The bacteria belonging to this group are commonly known as the vinegar bacteria and are characterized by their ability to oxidize ethyl alcohol to acetic acid.

This habit of surface growth and film formation may be due to the high oxygen requirements, adaptation to surface tension forces of the medium or unknown factor inherent in the cells. These surface growing bacteria, such as the acetobacter, exert a strong oxidizing reaction on the substrate, by which we mean the medium upon which they are growing. For this reason, they have been employed in the industries to oxidize alcohols to acids, as for example, ethyl alcohol to acetic acid, aldoses to their corresponding aldonic acids, as for example d-glucose to d-gluconic acid, and polyhydric alcohols to ketones, as for example gylcerine to dioxyacetone.

Two general methods have been employed to use these film forming bacteria in the fermentation industry. One is known as the generator type, in which the liquor is trickled over an aerated packing of porous material contained in a deep tank. The other method involves spreading the liquor out in thin layers in shallow pans or trays.

The chief objection to the generator method is that in practice it is often found difficult to maintain a pure culture of the bacteria in the packing. The handling of a pan or tray process requires too much hand labor and also exposes the liquors to contamination with objectionable organisms.

We have discovered a process, which is easily adapted to practice, and which is not subject to the difficulties inherent in the processes just described. We have discovered that bacteria belonging to the acetobacter group, which ordinarily are cultivated in surface films, will grow normally and vigorously when the nutrient liquor in which they are placed is converted into a foam. By a foam, we mean that the larger part of the body of liquor is converted into a mass of air globules, each one of which is surrounded by a film of liquor.

To obtain the foam we employ a deep tank equipped with a high speed stirrer and having an air vent. The size, speed, and location of the stirrer and the pitch of the blades must all be so adjusted that the larger part of the body of liquor is converted into a rolling mass of foam with an air vortex created by the suction of the stirrer blades. Mere agitation of the liquor is of little or no aid in promoting the fermentation. The agitation must be of a type that whips the larger part of the mass of liquor into a foam.

If the composition of the liquor does not favor the production of a satisfactory foam, a small amount of a saponin or other suitable emulsifying agent is added.

The rate of fermentation can be increased by leading oxygen, or mixtures of air and oxygen, or other favoring gas mixtures into the body of foam.

We also obtain a foam by passing air into the bottom of the fermentation vessel through a suitable distributer with or without stirring. We prefer the high speed stirring method.

*Example I.*—We place 10 liters of solution containing 1500 grams of commercial glucose ($C_6H_{12}O_6.H_2O$) and a nutrient extract (150 gms. of standard malt syrup) in a vessel equipped with a high speed stirrer. We inoculate the liquor with a suspension of acetobacter gluconicum. For a reference to this particular bacterium, see article by Siegwart Hermann, in Biochemische Zeitschrift, Jan. 1928, Vol. 192: 176-199, at p. 198. The stirrer is brought up to a speed of about 2000 revolutions per minute and the entire body of liquor is converted into a mass of foam. The contents of the vessel are maintained at a temperature of 30°-34° C. Within 48 to 60 hours 90 to 95% of the glucose has been converted to d-gluconic acid. The rate of the fermentation can be increased by introducing suitable quantities of neutralizing agents, such as calcium carbonate, the carbonates of other alkaline earths, or the carbonates of sodium and potassium at the beginning or at intervals during the course of the fermentation. The gluconic acid, or salts of gluconic acid, if neutralizing agents have been added, can be recovered by the ordinary procedures.

*Example II.*—If in a similar procedure we use 700 gms. of glycerine instead of 1500 grams of commercial glucose, but without a neutralizing agent, we obtain dioxyacetone in yield of about 90% of the theoretical amount.

The apparatus used can vary widely, so long as a foam is produced and maintained in an elongated column without overflowing the vessel, and with where desired, provision for supplying oxygen in addition to that drawn in by the vortex. We have obtained successful results on a small scale using a quart size glass vessel and a beverage mixer driven by a motor whose speed can be regulated to control the height of the foam. A very suitable mixer is known as Polar Cub Senior Mixer No. B88, but we do not restrict ourselves to any specific apparatus as long as the desired conditions are produced. While we mention acetobacter as typical of the bacteria which may be used we do not restrict ourselves thereto as our invention is applicable to many other film forming bacteria which grow in a solution by aid of gases.

The invention claimed is:

1. A process comprising inoculating an aqueous solution containing a nutrient and a member selected from the group consisting of an aldose and an aliphatic secondary polyhydric alcohol with film forming bacteria, forming said solution into a foam and effecting fermentation in the foam.

2. A process of preparing an aldonic acid from an aldose, comprising inoculating an aqueous aldose solution containing a nutrient with film forming bacteria, forming said solution into a foam, and effecting fermentation in the foam.

3. A process of preparing a ketone from a polyhydric alcohol comprising inoculating an aqueous aliphatic secondary polyhydric alcohol solution containing a nutrient with film forming bacteria, forming said solution into a foam, and effecting fermentation in the foam.

4. A process of preparing d-gluconic acid from d-glucose, comprising inoculating an aqueous d-glucose solution containing a nutrient with film forming bacteria, forming said solution into a foam, and effecting fermentation in the foam.

5. A process of preparing dioxyacetone from glycerine, comprising inoculating an aqueous glycerine solution containing a nutrient with film forming bacteria, forming said solution into a foam, and effecting fermentation in the foam.

6. A process of preparing d-gluconic acid from d-glucose, comprising inoculating an aqueous d-glucose solution containing a nutrient with film forming bacteria, forming said solution into a foam in the presence of an emulsifying agent, and effecting fermentation in the foam.

7. A process of preparing dioxyacetone from glycerine, comprising inoculating an aqueous glycerine solution containing a nutrient with film forming bacteria, forming said solution into a foam in the presence of an emulsifying agent, and effecting fermentation in the foam.

8. A process of preparing an aldonic acid from an aldose comprising inoculating a 15% aqueous aldose solution containing 1.5% nutrient with a suspension of bacteria of the acetobacter group, forming said solution into foam by high speed agitation, and effecting fermentation in the foam.

9. A process of preparing d-gluconic acid from d-glucose comprising inoculating a 15% aqueous d-glucose solution containing 1.5% malt syrup with a suspension of bacteria of the acetobacter group, forming said solution into a foam by high speed agitation, and effecting fermentation in the foam.

10. A process of preparing dioxyacetone from glycerine comprising inoculating a 7% aqueous glycerine solution containing 1.5% malt syrup with a suspension of bacteria of the acetobacter group, forming said solution into a foam by high speed agitation, and effecting fermentation in the foam.

11. A process of preparing d-gluconic acid from d-glucose comprising inoculating a 15% aqueous d-glucose solution containing 1.5% malt syrup with a suspension of bacteria of the acetobacter group, forming said solution into a foam by high speed agitation in the presence of an emulsifying agent, and effecting fermentation in the foam.

12. A process of preparing dioxyacetone from glycerine comprising inoculating a 7% aqueous gylcerine solution containing 1.5% malt syrup with a suspension of bacteria of the acetobacter group, forming said solution into a foam by high speed agitation in the presence of an emulsifying agent, and effecting fermentation in the foam.

13. A process of preparing salts of d-gluconic acid from d-glucose comprising inoculating a 15% aqueous d-glucose solution containing 1.5% malt syrup with a suspension of bacteria of the acetobacter group, forming said solution into a foam by high speed agitation in the presence of a neutralizing agent, and effecting fermentation in the foam.

Signed at Brooklyn in the county of Kings and State of New York this 2nd day of February A. D. 1931.

JAMES N. CURRIE.
ALEXANDER FINLAY.